United States Patent
Xie et al.

(10) Patent No.: US 8,624,751 B2
(45) Date of Patent: Jan. 7, 2014

(54) CAPACITIVE PROXIMITY ALARM CIRCUIT AND SYSTEM

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 306 days.

(21) Appl. No.: 13/186,768

(22) Filed: Jul. 20, 2011

(65) Prior Publication Data

US 2012/0161976 A1    Jun. 28, 2012

(30) Foreign Application Priority Data

Dec. 20, 2010   (CN) .......................... 2010 1 0609139

(51) Int. Cl.
*G08B 13/26* (2006.01)
*G08B 21/22* (2006.01)

(52) U.S. Cl.
USPC ..... 340/686.6; 307/652; 340/562; 340/573.1; 361/179

(58) Field of Classification Search
USPC ............. 200/600; 307/116, 125, 652; 324/66, 324/658; 327/517; 340/562, 568.1, 573.1, 340/657, 666, 686.1, 686.6; 361/179, 181; 600/525
See application file for complete search history.

(56) References Cited

U.S. PATENT DOCUMENTS

| | | | | |
|---|---|---|---|---|
| 6,079,738 A | * | 6/2000 | Lotito et al. | 280/735 |
| 2002/0109035 A1 | * | 8/2002 | Denen et al. | 242/559.1 |
| 2003/0062908 A1 | * | 4/2003 | Venter et al. | 324/661 |
| 2003/0122669 A1 | * | 7/2003 | Filippov et al. | 340/563 |
| 2004/0113634 A1 | * | 6/2004 | Stanley et al. | 324/661 |
| 2005/0099319 A1 | * | 5/2005 | Hutchison et al. | 340/908 |
| 2006/0055534 A1 | * | 3/2006 | Fergusson | 340/562 |

* cited by examiner

*Primary Examiner* — Benjamin C Lee
*Assistant Examiner* — Stephen Burgdorf
(74) *Attorney, Agent, or Firm* — Altis Law Group, Inc.

(57) ABSTRACT

An alarm system for emitting an alarm includes a distance detecting circuit, a gate circuit, a voltage conversion circuit, a distance judging circuit and an alarm circuit. The distance detecting circuit receives a first signal, detects a distance between an object and the alarm system, outputs a second signal and a third signal according to the distance. The gate circuit receives the second signal and the third signal and outputs a voltage level signal. The voltage conversion circuit receives the voltage level signal and converts the voltage level signal into a DC voltage signal. The distance judging circuit receives the DC voltage signal and compares the DC voltage signal against a reference voltage signal to output a control signal if necessary. The alarm circuit receives the control signal and produces the alarm when the distance between the object and the alarm system is less than a threshold distance.

8 Claims, 2 Drawing Sheets

CAPACITIVE PROXIMITY ALARM CIRCUIT AND SYSTEM

BACKGROUND

1. Technical Field

The disclosure generally relates to an alarm system, and especially to an alarm system for producing an alarm as an object is getting physically close to the system.

2. Description of Related Art

A machine tool is a powered mechanical device, typically used to fabricate metal components by the selective removal of metal. The term machine tool is usually reserved for tools that use a power source other than human movement, but the power source can be human if appropriately set up. Many historians of technology consider that the true machine tools were born when direct human involvement was removed from the shaping or stamping processes of the different kinds of tools. When the machine tool starts shaping or stamping, people may unthinkingly or enthusiastically get close to the machine tool and put themselves in danger of injury.

Therefore, in the lack of an effective proximity alarm, there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
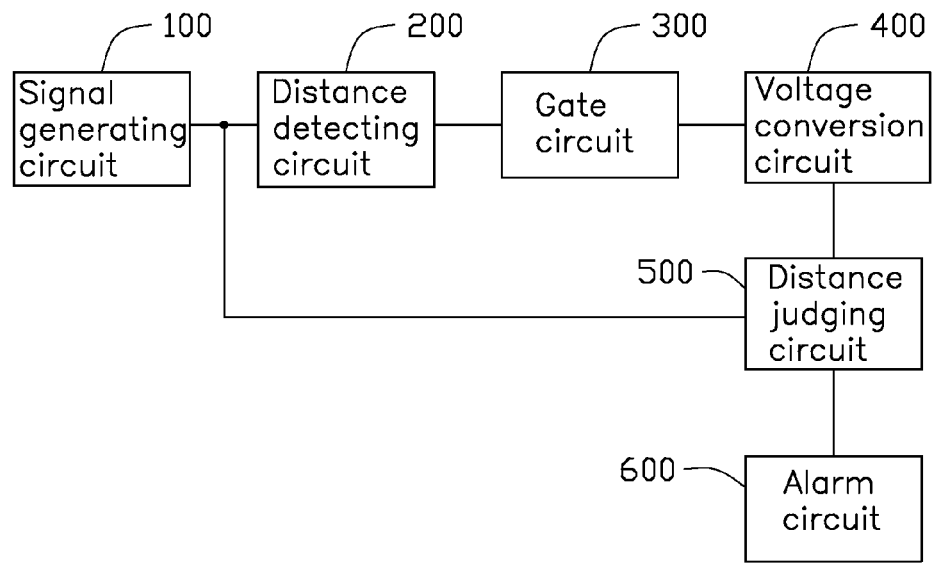
FIG. 1 is a block view of an embodiment of an alarm system.

Referring to FIG. 1, an embodiment of an alarm system for producing an alarm when a distance from an object (not shown) is less than a threshold distance, includes a signal generating circuit 100, a distance detecting circuit 200, a gate circuit 300, a voltage conversion circuit 400, a distance judging circuit 500 and an alarm circuit 600.

The signal generating circuit 100 generates a first signal. The distance detecting circuit 200 receives the first signal and detects a distance between the object and the alarm system, and it outputs a second signal and a third signal according to a predetermined plurality of distances. The gate circuit 300 receives the second signal and the third signal and outputs a voltage level signal. The voltage conversion circuit 400 receives the voltage level signal and converts the voltage level signal to a DC voltage signal. The distance judging circuit 500 receives the DC voltage signal and compares the DC voltage signal with a reference voltage signal to output a control signal. The alarm circuit 600 receives the control signal and produces the alarm when the distance between the object and the alarm system is less than the threshold distance.

Figure 2:
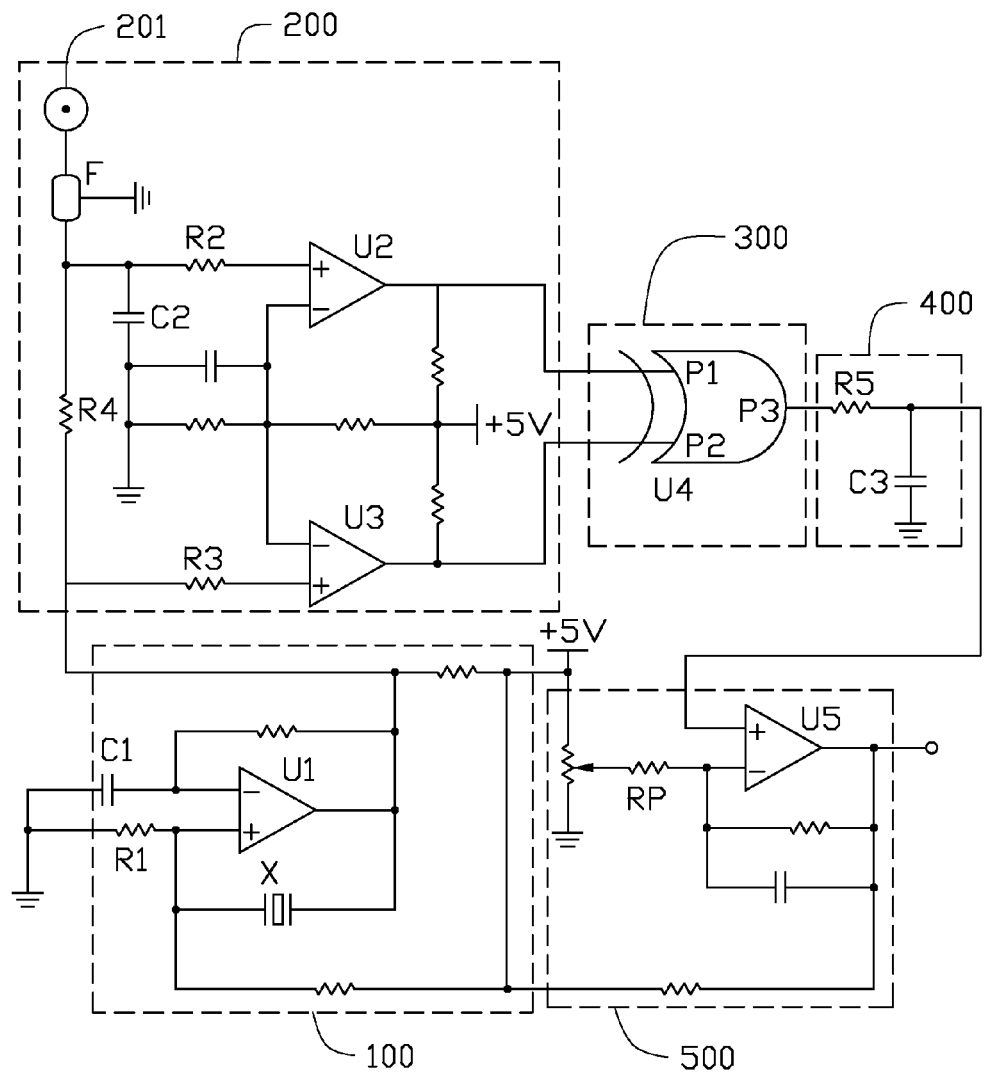
FIG. 2 is a circuit view of the embodiment of FIG. 1.

Referring to FIG. 2, the signal generating circuit 100 includes a first operational amplifier U1, an crystal oscillator X, a first resistor R1 and a first capacitor C1. The first operational amplifier U1 includes a first operational amplifier non-inverting input terminal, a first operational amplifier inverting input terminal and a first operational amplifier output terminal. The first operational amplifier non-inverting input terminal is grounded via the first resistor R1. The first operational amplifier inverting input terminal is grounded via the first capacitor C1. The first operational amplifier non-inverting input terminal is electrically connected to the first operational amplifier output terminal via the crystal oscillator X.

The distance detecting circuit 200 includes a second operational amplifier U2, a third operational amplifier U3, a metal slice 201, a bead F, a second resistor R2, a third resistor R3, a fourth resistor R4 and a second capacitor C2. The second operational amplifier U2 includes a second operational amplifier non-inverting input terminal, a second operational amplifier inverting input terminal and a second operational amplifier output terminal. The third operational amplifier U3 includes a third operational amplifier non-inverting input terminal, a third operational amplifier inverting input terminal and a third operational amplifier output terminal. The bead F includes a bead first terminal and a bead second terminal. The fourth resistor R4 includes a fourth resistor first terminal and a fourth resistor second terminal. The second capacitor C2 includes a second capacitor first terminal and a second capacitor second terminal.

The second operational amplifier non-inverting input terminal is electrically connected to the bead first terminal via the second resistor R2. The bead second terminal is electrically connected to the metal slice 201 to detect the distance between the object and the alarm system. The second operational amplifier non-inverting input terminal is electrically connected to the second capacitor first terminal via the second resistor R2. The second capacitor second terminal is grounded. The third operational amplifier non-inverting input terminal is electrically connected to the fourth resistor first terminal via the third resistor R3. The fourth resistor second terminal is electrically connected to a first connection point between the bead F and the second resistor R2. The third operational amplifier non-inverting input terminal is electrically connected to the first operational amplifier output terminal via the third resistor R3. The third operational amplifier inverting input terminal is electrically connected to the second operational amplifier inverting input terminal.

The gate circuit 300 includes an Exclusive OR logic chip U4. The Exclusive OR logic chip U4 includes a first input terminal P1, a second input terminal P2 and an Exclusive OR logic chip output terminal P3. The first input terminal P1 is electrically connected to the second operational amplifier output terminal. The second input terminal P2 is electrically connected to the third operational amplifier output terminal.

The voltage conversion circuit 400 includes a fifth resistor R5 and a third capacitor C3. The fifth resistor R5 includes a fifth resistor first terminal and a fifth resistor second terminal. The fifth resistor first terminal is electrically connected to the Exclusive OR logic chip output terminal P3. The fifth resistor second terminal is grounded via the third capacitor C3.

The distance judging circuit 500 includes a comparator U5 and a variable resistor RP. The comparator U5 includes a comparator non-inverting input terminal, a comparator inverting input terminal and a comparator output terminal. The variable resistor RP includes a variable resistor first terminal, a variable resistor second terminal and a variable resistor adjust terminal. The comparator non-inverting input terminal is electrically connected to a second connection point between the fifth resistor R5 and the third capacitor C3. The comparator inverting input terminal is electrically connected to the variable resistor adjust terminal. The variable resistor first terminal receives a +5 volts first DC voltage. The variable resistor second terminal is grounded. The comparator output terminal outputs the control signal.

In use, when the metal slice 201 detects that the object is getting close to the alarm system, a dynamic capacitance (dynamic capacitor) is formed between the object and the metal slice 201. The capacitance of the dynamic capacitor increases as the distance between the object and the alarm system decreases. The dynamic capacitor and the second capacitor C2 form a parallel capacitor. The capacitance of this parallel capacitor increases as the capacitance of the dynamic capacitor increases. The fourth resistor R4, the parallel capacitor and the metal slice 201 form a delay circuit at the second operational amplifier non-inverting input terminal. The first signal generated by the signal generating circuit 100 is delayed by the delay circuit and input into the second operational amplifier U2. The first signal generated by the signal generating circuit 100 is also input into the third operational amplifier U3 but without being delayed.

There is a phase difference between the second signal from the second operational amplifier output terminal and the third signal from the third operational amplifier output terminal. The first input terminal P1 and the second input terminal P2 have different signal inputs and the Exclusive OR logic chip output terminal P3 outputs a high voltage level signal. The voltage conversion circuit 400 converts the high voltage level signal to a linear DC voltage. A duty cycle of the high voltage level signal increases as the phase difference between the second signal and the third signal increases. Therefore the duty cycle of the high voltage level signal and the linear DC voltage increase as the distance between the object and the alarm system decreases. The +5 volts first DC voltage generates the reference voltage at the comparator inverting input terminal.

If the linear DC voltage is greater than the reference voltage, the comparator output terminal outputs a high voltage level control signal to drive the alarm circuit 600 to produce the alarm. In one embodiment, a resistance of the variable resistor RP can be adjusted by the variable resistor adjust terminal to adjust the reference voltage and therefore the threshold distance. The alarm circuit 600 can emit light or make a sound in producing the alarm.

It is to be understood, however, that even though numerous characteristics and advantages have been set forth in the foregoing description of the preferred embodiments, together with details of the structures and functions of the preferred embodiments, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An alarm system for alarming when a distance from an object is less than a threshold distance, comprising:
    a signal generating circuit adapted to generate a first signal;
    a distance detecting circuit adapted to receive the first signal, detect a distance between the object and the alarm system, output a second signal and a third signal according to the distance;
    a gate circuit adapted to receive the second signal and the third signal and output a voltage level signal;
    a voltage conversion circuit adapted to receive the voltage level signal and convert the voltage level signal to a DC voltage signal;
    a distance judging circuit adapted to receive the DC voltage signal and compare the DC voltage signal with a reference voltage signal to output a control signal; and
    an alarm circuit adapted to receive the control signal and produce an alarm when the distance between the object and the alarm system is less than the threshold distance,
    wherein the signal generating circuit comprises a first operational amplifier, a crystal oscillator, a first resistor and a first capacitor; the first operational amplifier comprises a first operational amplifier non-inverting input terminal, a first operational amplifier inverting input terminal and a first operational amplifier output terminal; the first operational amplifier non-inverting input terminal is grounded via the first resistor; the first operational amplifier inverting input terminal is grounded via the first capacitor; and the first operational amplifier non-inverting input terminal is electrically connected to the first operational amplifier output terminal via the crystal oscillator;
    the distance detecting circuit comprises a second operational amplifier, a metal slice, a second resistor and a second capacitor; the second operational amplifier comprises a second operational amplifier non-inverting input terminal, a second operational amplifier inverting input terminal and a second operational amplifier output terminal; the second capacitor comprises a second capacitor first terminal and a second capacitor second terminal; the second operational amplifier non-inverting input terminal is electrically connected to the metal slice to detect the distance between the object and the alarm system; the second operational amplifier non-inverting input terminal is electrically connected to the second capacitor first terminal via the second resistor; and the second capacitor second terminal is grounded;
    the distance detecting circuit further comprises a third operational amplifier; a third resistor and a fourth resistor; the third operational amplifier comprises a third operational amplifier non-inverting input terminal, a third operational amplifier inverting input terminal and a third operational amplifier output terminal; the fourth resistor comprises a fourth resistor first terminal and a fourth resistor second terminal; the third operational amplifier non-inverting input terminal is electrically connected to the fourth resistor first terminal via the third resistor; the fourth resistor second terminal is electrically connected to a first connection point between the metal slice and the second resistor; the third operational amplifier non-inverting input terminal is electrically connected to the first operational amplifier output terminal via the third resistor; and the third operational amplifier inverting input terminal is electrically connected to the second operational amplifier inverting input terminal;
    the gate circuit comprises an Exclusive OR logic chip; the Exclusive OR logic chip comprises a first input terminal, a second input terminal and an Exclusive OR logic chip output terminal; the first input terminal is electrically connected to the second operational amplifier output terminal; and the second input terminal is electrically connected to the third operational amplifier output terminal;
    the voltage conversion circuit comprises a fifth resistor and a third capacitor; the fifth resistor comprises a fifth resistor first terminal and a fifth resistor second terminal; the fifth resistor first terminal is electrically connected to the Exclusive OR logic chip output terminal; and the fifth resistor second terminal is grounded via the third capacitor;

the distance judging circuit comprises a comparator and a variable resistor; the comparator comprises a comparator non-inverting input terminal, a comparator inverting input terminal and a comparator output terminal; the variable resistor comprises a variable resistor first terminal, a variable resistor second terminal and a variable resistor adjust terminal; the comparator non-inverting input terminal is electrically connected to a second connection point between the fifth resistor and the third capacitor; the comparator inverting input terminal is electrically connected to the variable resistor adjust terminal; the variable resistor first terminal receives a first DC voltage; the variable resistor second terminal is grounded; and the comparator output terminal is adapted to output the control signal.

2. The alarm system of claim 1, wherein the first operational amplifier output terminal is adapted to output the first signal; the second operational amplifier output terminal is adapted to output the second signal; and the third operational amplifier output terminal is adapted to output the third signal.

3. The alarm system of claim 1, wherein the Exclusive OR logic chip output terminal is adapted to output the voltage level signal; the second connection point between the fifth resistor and the third capacitor is adapted to output the DC voltage signal; and the comparator output terminal is adapted to output the control signal.

4. The alarm system of claim 1, wherein the alarm circuit is adapted to emit light or make a sound to produce the alarm.

5. An alarm system for alarming when a distance from an object is less than a threshold distance, comprising:

a distance detecting circuit adapted to receive a first signal, detect a distance between the object and the alarm system, output a second signal and a third signal according to the distance;

a gate circuit adapted to receive the second signal and the third signal and output a voltage level signal;

a voltage conversion circuit adapted to receive the voltage level signal and convert the voltage level signal to a DC voltage signal;

a distance judging circuit adapted to receive the DC voltage signal and compare the DC voltage signal with a reference voltage signal to output a control signal;

an alarm circuit adapted to receive the control signal and produce an alarm when the distance between the object and the alarm system is less than the threshold distance; and a signal generating circuit adapted to generate the first signal; wherein the signal generating circuit comprises a first operational amplifier, a crystal oscillator, a first resistor and a first capacitor; the first operational amplifier comprises a first operational amplifier non-inverting input terminal, a first operational amplifier inverting input terminal and a first operational amplifier output terminal; the first operational amplifier non-inverting input terminal is grounded via the first resistor; the first operational amplifier inverting input terminal is grounded via the first capacitor; and the first operational amplifier non-inverting input terminal is electrically connected to the first operational amplifier output terminal via the crystal oscillator;

the distance detecting circuit comprises a second operational amplifier, a metal slice, a second resistor and a second capacitor; the second operational amplifier comprises a second operational amplifier non-inverting input terminal, a second operational amplifier inverting input terminal and a second operational amplifier output terminal; the second capacitor comprises a second capacitor first terminal and a second capacitor second terminal; the second operational amplifier non-inverting input terminal is electrically connected to the metal slice to detect the distance between the object and the alarm system; the second operational amplifier non-inverting input terminal is electrically connected to the second capacitor first terminal via the second resistor; and the second capacitor second terminal is grounded;

the distance detecting circuit further comprises a third operational amplifier; a third resistor and a fourth resistor; the third operational amplifier comprises a third operational amplifier non-inverting input terminal, a third operational amplifier inverting input terminal and a third operational amplifier output terminal; the fourth resistor comprises a fourth resistor first terminal and a fourth resistor second terminal; the third operational amplifier non-inverting input terminal is electrically connected to the fourth resistor first terminal via the third resistor; the fourth resistor second terminal is electrically connected to a first connection point between the metal slice and the second resistor; the third operational amplifier non-inverting input terminal is electrically connected to the first operational amplifier output terminal via the third resistor; and the third operational amplifier inverting input terminal is electrically connected to the second operational amplifier inverting input terminal;

the gate circuit comprises an Exclusive OR logic chip; the Exclusive OR logic chip comprises a first input terminal, a second input terminal and an Exclusive OR logic chip output terminal; the first input terminal is electrically connected to the second operational amplifier output terminal; and the second input terminal is electrically connected to the third operational amplifier output terminal;

the voltage conversion circuit comprises a fifth resistor and a third capacitor; the fifth resistor comprises a fifth resistor first terminal and a fifth resistor second terminal; the fifth resistor first terminal is electrically connected to the Exclusive OR logic chip output terminal; and the fifth resistor second terminal is grounded via the third capacitor; the distance judging circuit comprises a comparator and a variable resistor; the comparator comprises a comparator non-inverting input terminal, a comparator inverting input terminal and a comparator output terminal; the variable resistor comprises a variable resistor first terminal, a variable resistor second terminal and a variable resistor adjust terminal; the comparator non-inverting input terminal is electrically connected to a second connection point between the fifth resistor and the third capacitor; the comparator inverting input terminal is electrically connected to the variable resistor adjust terminal; the variable resistor first terminal receives a first DC voltage; the variable resistor second terminal is grounded; and the comparator output terminal is adapted to output the control signal.

6. The alarm system of claim 5, wherein the first operational amplifier output terminal is adapted to output the first signal; the second operational amplifier output terminal is adapted to output the second signal; and the third operational amplifier output terminal is adapted to output the third signal.

7. The alarm system of claim 5, wherein the Exclusive OR logic chip output terminal is adapted to output the voltage level signal; the connection point between the fifth resistor and the third capacitor is adapted to output the DC voltage signal; and the comparator output terminal is adapted to output the control signal.

8. The alarm system of claim 5, wherein the alarm circuit is adapted to emit light or make a sound to produce the alarm.

* * * * *